United States Patent
Pegg et al.

(10) Patent No.: US 9,621,958 B2
(45) Date of Patent: Apr. 11, 2017

(54) DEFERRED, ON-DEMAND LOADING OF USER PRESENCE WITHIN A REAL-TIME COLLABORATIVE SERVICE

(75) Inventors: Nigel Leigh Pegg, San Francisco, CA (US); Arun Ponnusamy, San Mateo, CA (US)

(73) Assignee: Adobe Systems Incorporated, San Jose, CA (US)

( * ) Notice: Subject to any disclaimer, the term of this patent is extended or adjusted under 35 U.S.C. 154(b) by 905 days.

(21) Appl. No.: 12/774,100

(22) Filed: May 5, 2010

(65) Prior Publication Data

US 2014/0223333 A1   Aug. 7, 2014

(51) Int. Cl.
| | | |
|---|---|---|
| *H04L 12/18* | (2006.01) | |
| *H04N 21/4788* | (2011.01) | |
| *H04L 12/58* | (2006.01) | |
| *H04L 29/08* | (2006.01) | |
| *H04N 7/15* | (2006.01) | |

(52) U.S. Cl.
CPC ..... *H04N 21/4788* (2013.01); *H04L 12/1822* (2013.01); *H04L 12/5815* (2013.01); *H04L 29/08684* (2013.01); *H04L 51/043* (2013.01); *H04L 67/24* (2013.01); *H04N 7/155* (2013.01)

(58) Field of Classification Search
CPC ............. H04L 12/5815; H04L 12/1813; H04L 12/1822; H04L 29/08684; H04L 51/043; H04L 67/24
USPC ......................................................... 715/751
See application file for complete search history.

(56) References Cited

U.S. PATENT DOCUMENTS

| | | | |
|---|---|---|---|
| 5,812,670 A * | 9/1998 | Micali ............................. 705/74 |
| 7,149,288 B2 * | 12/2006 | Digate et al. .............. 379/88.17 |
| 7,734,697 B2 * | 6/2010 | Blohm ......................... 709/206 |
| 7,984,102 B1 * | 7/2011 | Raphel et al. ................ 709/206 |
| 8,161,396 B2 * | 4/2012 | Barber et al. ................. 715/751 |
| 8,291,067 B2 * | 10/2012 | Veeramachaneni et al. . 709/224 |
| 2005/0138566 A1 * | 6/2005 | Muller et al. ................. 715/759 |
| 2006/0242232 A1 * | 10/2006 | Murillo ............... H04L 12/1813 709/204 |
| 2007/0150825 A1 * | 6/2007 | Jachner ........................ 715/765 |
| 2008/0207329 A1 * | 8/2008 | Wallace et al. ................. 463/42 |
| 2009/0063991 A1 * | 3/2009 | Baron et al. .................. 715/751 |
| 2009/0063995 A1 * | 3/2009 | Baron et al. .................. 715/753 |

(Continued)

*Primary Examiner* — Alvin Tan
(74) *Attorney, Agent, or Firm* — Kilpatrick Townsend & Stockton LLP (57) ABSTRACT

Techniques disclosed herein include systems and methods that enable a relatively large number of users to connect to a collaborative communication application with a comparatively lower investment in service hardware (CPU, network) while still providing identification of contributing client devices. Techniques disclosed herein can also include systems and methods that enable an application developer to build higher-performing applications that reduce a computational load for client devices. A session manager, for a collaborative service session, provides selective transmission of user records on an as-needed basis, and thus avoids sending user records until those records are actually needed or requested, typically as a result of a user's active participation within the collaboration environment. The session manager thus reveals the presence of connected users on-demand, thereby saving CPU and network resources, and allowing collaborative applications to more easily scale into the tens of thousands of users.

20 Claims, 4 Drawing Sheets

(56) References Cited

U.S. PATENT DOCUMENTS

2009/0089439 A1* 4/2009 Benco et al. .................. 709/228
2011/0145338 A1* 6/2011 Munson ......................... 709/206

* cited by examiner

DEFERRED, ON-DEMAND LOADING OF USER PRESENCE WITHIN A REAL-TIME COLLABORATIVE SERVICE

BACKGROUND

The present disclosure relates to online collaboration services. Online collaboration services enable multiple users or entities to interactively communicate, exchange ideas, and otherwise participate with each other over a given network. Users can interact with each other by interfacing with various computing devices such as desktop computers, mobile phones, televisions, and other interactive devices. Collaboration services can enable communication to various mediums or combinations of communication mediums, and typically operate within a given active session, forum, or virtual room. For example, such collaboration services can include chat sessions or similar messaging systems that enable participants to exchange textual information or submit comments related to a current subject of interest. In another example, a given collaboration service provides videoconferencing in which participants can see and communicate with each other. Other collaboration services enable participants to enter drawing strokes or markup a shared graphical display, similar to writing on a group white board or chalkboard. Another conventional collaboration service is known as Web conferencing. Web conferencing interfaces often combine two or more communication mediums within a single graphical user interface or display, such as by simultaneously displaying regions for video display, graphical illustration, and chat messaging. Collaboration services are distinct from passive communication models. Passive communication models, such as information broadcasts or multicasts, function for recipients that simply receive a data transmission without establishing an active connection for interaction among other recipients. Collaborative services provide a participatory communication model.

SUMMARY

Typically, conventional systems for providing collaboration services, or other networked interactive applications, operate by enabling client devices (clients or users of client devices) to connect to a particular collaboration service session. For example, a client device can connect with an application server or other provider of a participatory communication application. By connecting to the collaboration service, client applications can maintain a persistent connection for a duration of a collaborative service event. With this persistent connection, connected client applications can send messages to the collaboration service, and the collaboration service can push messages to the client applications. With such a connection structure, client applications can interactively communicate and otherwise collaborate. The collaboration service can push subject matter content for use as a topic of discussion, such as with a slide presentation.

One common feature of collaboration services is to maintain and identify who is connected to a given collaboration service session. Such identification of connected participants is usually expressed through client applications themselves, such as by displaying a list or roster of connected devices/participants. During a typical scenario, a new client connects to the collaboration service session, and transmits a message to the collaboration service identifying that the new client application is connected. The collaboration service, in turn, processes that connection message, and then broadcasts this new connection to every client application connected to the collaboration service within the same session, virtual room or other common collaboration event. By broadcasting client connections, individual client applications can build roster lists identifying connected client applications or connected users within a same collaboration session or virtual room.

Client identification and roster lists are important within collaborative environments, while, conversely, anonymity within collaborative environments can be counterproductive. For example, contributions from particular users can carry more weight or be more persuasive when the source of the contribution is known. In a more specific example, if an unknown client contributed a specific comment within a chat session, then the specific comment might be largely ignored. Whereas, if client applications identified the specific comment as being contributed by a recognized actor, than other participants will instinctively know that the specific comment will be well thought out and impressively poignant. Accordingly, client identification can be important.

One challenge with client identification within collaborative environments, however, is the challenge of scale. Certain collaborative services can provide sessions or rooms of unbounded capacity, which can accommodate hundreds, thousands, hundreds of thousands, or even more participants. As a number of participants increases, the task of maintaining a list of active users becomes increasingly difficult, especially as the number of active participants exceeds about 1000 client devices. By way of a non-limiting example, consider a virtual room, hosted by a collaboration service, that has 10,000 active users connected to this virtual room. In this example, when a new user enters the virtual room a connection message associated with the new user needs to be pushed to 10,000 other users. Additionally, each client application needs to receive and process messages, related to presence status, of each of the other 10,000 users in the virtual room. Thus, for a single user entering the virtual room, upon receiving this new user's connection message, the collaboration service needs to push this message to the 10,000 connected users, and then also push a connection status message to the new user for each of the currently connected 10,000 users. Thus the collaboration service transmits about 20,000 messages for that single event or data transaction.

With many connected users, the collaboration service has a large computational workload for managing status of connected client devices. In order to maintain a list of users connected to the collaboration service on each client, the service itself is responsible for sending details of each user (such as names, status, roles, and other associated metadata) to every connected device. This leads to an $N^2$ messaging problem. With 10,000 active users, for example, the collaboration service needs to transmit 10,000 times 10,000 messages, which would be 100,000,000 messages just to update each client application. Likewise, each client application has an immense workload processing the thousands of messages. Client devices typically have less computing resources than hardware associated with a collaboration service. Client devices might be desktop computers, laptop computers, mobile phones, and other personal electronic devices, which will be computationally taxed in trying to process thousands of client status messages along with contributory data events and transactions such as chat messages. Thus, there is a significant computational load both on the client-side and server-side, which can lead to slowed service, limits on a number of clients that he can be connected, or even cause the collaborative service sessions to crash. Such failures can be more likely at a beginning of the collaboration session. For example, some virtual rooms can be scheduled to open at a particular time causing thousands of clients to attempt to connect approximately simultaneously. While most connection messages contain similar content, each message applies to a different client application or user identification and thus each message is different.

Techniques disclosed herein include systems and methods that enable a relatively large number of users to connect to a collaborative application with a comparatively lower investment in service hardware (CPU, network) while still providing identification of contributing client devices. Techniques disclosed herein can also include systems and methods that enable an application developer to build higher-performing applications that reduce a computational load for client devices. A session manager, for a collaborative service session, provides selective transmission of user records on an as-needed basis, and thus avoids sending user records until those records are actually needed or requested. Such a request is typically the result of a user's active participation within the collaborative environment. The session manager thus reveals the presence of connected users on-demand, thereby saving CPU and network resources, and allowing collaborative applications to more easily scale into the tens of thousands of users.

In one embodiment, a session manager provides a collaborative communication session that actively connects an application server and a plurality of client devices. The session manager connects client devices for a duration of the collaborative service communication session so that data events, received from a given client device connected to the collaborative communication session, are broadcast via the application server to each client device within a plurality of client devices. The collaborative communication session is enabled to selectively publish presence information associated with each client device to the plurality of client devices for each client device to maintain a list of connected participants. The session manager maintains presence information from each client device initially joining the collaborative communication session. For example, a participant logs in to a particular virtual room. The presence information can include connection status and metadata associated with each respective client device. Metadata associated with a respective client device means metadata or other information associated with a participant connecting to the collaborative communication session via the client device.

The session manager stores this presence information, received from each client device joining the collaborative communication session, without transmitting this presence information associated with each client device to the plurality of client devices. Thus the session manager receives presence information associated with participants, but refrains from automatically broadcasting this presence information to each connected client. In response to receiving a contributory data event from a first client device, the session manager broadcasts this contributory data event to the plurality of client devices without broadcasting presence information associated with this particular client device. The contributory data event refers to a data transaction or other data input that is to be broadcast to the plurality of client devices, other than presence information. Thus, the contributory data event is a broadcast communication event. For example, a client device transmits a comment or remark about a particular topic to be transmitted to, and displayed on, each connected client device.

In response to receiving a request from a second client device for presence information associated with the first client device, the session manager transmits presence information associated with the first client device to the second client device. That is, the presence information transmitted is presence information associated with the client device that transmitted the contributory data event. For example, one or more participants, upon viewing the comment or remark about a particular topic, desires to know an identity of the contributing client device (identity of associated participant) and transmits a request for an identity of this particular contributing client device.

In another embodiment, the session manager broadcasts the contributory data event by tagging the broadcast contributory data event with a unique user identifier as part of a message payload, but without including presence information in the message payload of a corresponding client device. This unique identifier is associated with the contributing client device. This unique identifier can be a reference identifier that may or may not be displayed with the contributory data event, but can be accessed or otherwise used by a given client device when requesting presence information. This has the advantage of avoiding inclusion of full user presence information in each message payload that a user broadcasts, resulting in more bandwidth and computational efficiency.

In another embodiment, the session manager, via client applications, can provide a query interface at connected client devices to fetch presence information associated with contributing client devices or other connected client devices. While all client devices within the plurality of client devices are actively connected to the collaborative service session, in many scenarios not all client devices are actively contributing data (apart from presence information) to be broadcast to the plurality of client devices. In some embodiments, the session manager actively connects the application server and more than 1000 client devices.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: providing a collaborative communication session that actively connects an application server and a plurality of client devices for a duration of the collaborative communication session such that data events, received from a given client device connected to the collaborative communication session, are broadcast via the application server to each client device within the plurality of client devices, the collaborative communication session being enabled to selectively publish presence information associated with each connected client device to the plurality of client devices for each client device to maintain a list of connected participants; receiving presence information from each client device initially joining the collaborative communication session, the presence information including connection status and metadata associated with each respective client device; storing the presence information, received from each client device joining the collaborative communication session, without transmitting the presence information associated with each client device to the plurality of client devices; in response to receiving a contributory data event from at least one client device, broadcasting the contributory data event to the plurality of client devices without broadcasting presence information associated with the at least one client device; and in response to receiving individual requests from client devices for presence information associated with the at least one client device, transmitting presence information associated with the at least one client device to individual requesting client devices. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Adobe Systems Incorporated of San Jose, Calif., USA.

As discussed above, techniques herein are well suited for use in software applications supporting collaborative service and web conferencing applications. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Techniques disclosed herein include systems and methods that enable a relatively large number of users to connect to a collaborative communication application with a comparatively lower investment in service hardware (CPU, network) while still providing identification of contributing client devices. Techniques disclosed herein can also include systems and methods that enable an application developer to build higher-performing applications that reduce a computational load for client devices. A session manager, for a collaborative service session, provides selective transmission of user records on an as-needed basis, and thus avoids sending user records until those records are actually needed or requested, typically as a result of a user's active participation within the collaboration environment. The session manager thus reveals the presence of connected users on-demand, thereby saving CPU and network resources, and allowing collaborative applications to more easily scale into the tens of thousands of users.

The session manager can accommodate developers building applications using a collaboration service to accommodate just a few participants to many thousands of participants, or more. Developers can configure or identify such applications as having selective presence notification or on-demand presence notification. With selective presence notification activated, rather than distributing client records to all connected clients as those clients connect and disconnect, the session manager refrains from distributing or pushing such client records to all connected clients. A given collaborative service application can be provided to enable clients to query a user record based on the unique identifier. Such functionality can be called from client to server. Once a participant's unique ID is known to the client application, the client application may retrieve information pertaining to that participant or user.

Active participation on a collaboration session typically functions by the publishing of messages from a client application to a collaborative service application or server. Such messages are subsequently distributed to other connected clients. For example, if a participant enters a chat message, then that chat message is pushed to all other clients in a corresponding chat room. The participant entering this chat message can be identified as actively participating instead of being only actively connected and enabled to participate. Such a message can be labeled as a contributed data event in that the participant is contributing data to a chat room or other forum. The transmission of this chat message, or rather a display of this chat message on individual client applications, confirms to client applications that the participant authoring the chat message is both connected and contributing. Note that a chat message is just one example of a contributory data event. Other examples of participation can include drawing a shape or character on a shared white board (which is communicated via data messages), or beginning to stream audio, which is also communicated by publishing data messages.

Such contributory data messages, published to the collaboration service, are tagged with a unique ID of a publishing client by the session manager before messages are distributed to connected clients. Such a publisher identification can be part of each message's standard data payload. One advantage to having the session manager add publisher IDs is to prevent spoofing by malicious applications.

The session manager operates by selectively communicating presence, or communicating presence upon request. For example, when a given client has sent a message, all other connected clients receive this message, which message contains the sender's unique ID. Each recipient client that determines to display the sender's display name and role, can then manually or automatically retrieve or fetch this information from the collaboration service. Each requesting client is then able to display corresponding presence information within a client application. Presence information associated with the sending user can be available soon as any message, such as chat, audio, shared cursors, etc., is received by the recipient client. Thus, the recipient can learn of the sender, and the sender's pertinent user details, after that sender has actively participated in the collaborative service session. This process dramatically reduces the number of user records that need to be distributed, especially in scenarios where a vast majority of connected clients will not actively participate, and thus the presence of non-participatory connected clients does not need to be revealed. Such a technique can reduce processing load by several orders of magnitude, enabling more users to be connected in a collaborative environment while seamlessly providing available presence information.

Figure 1:
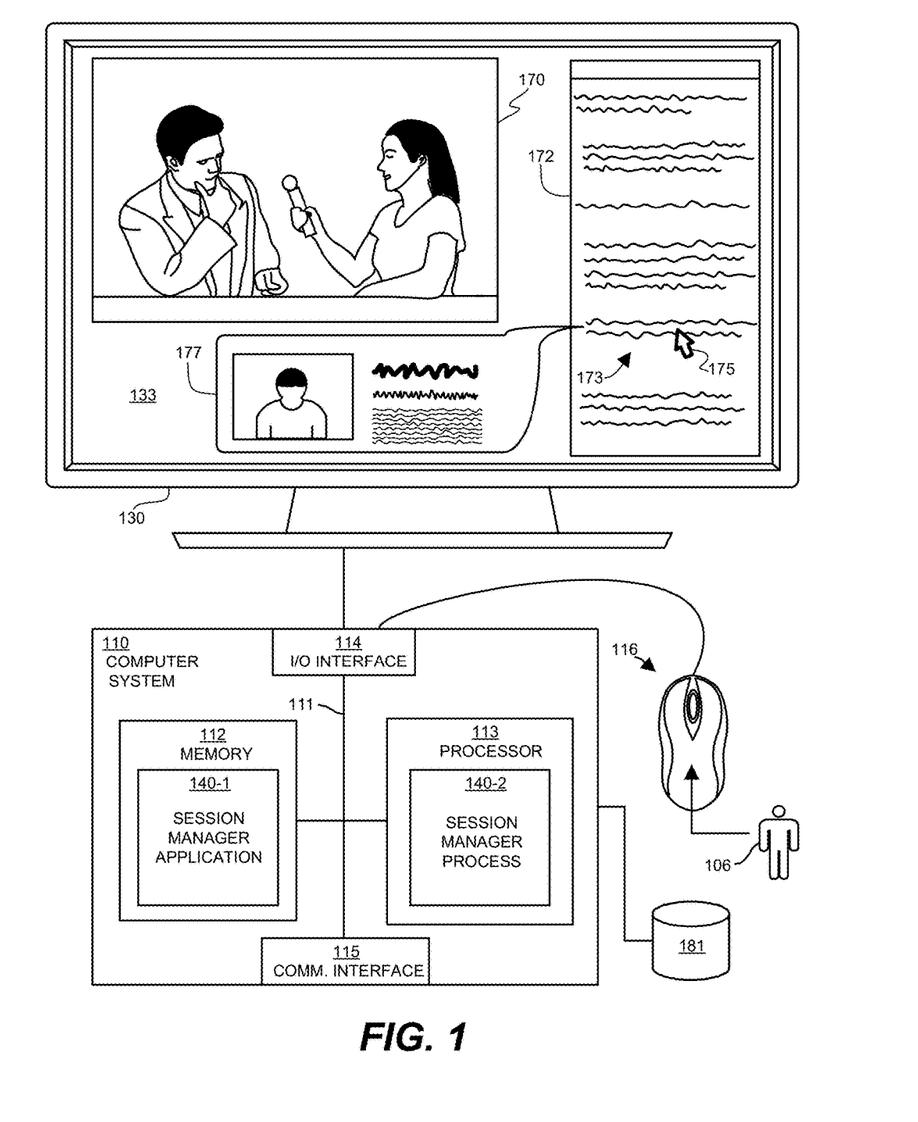
FIG. 1 is an example block diagram of a session manager operating in a computer/network environment according to embodiments herein.

FIG. 1 illustrates a more specific example of a collaborative service session and selected user presence retrieval. Within graphical user interface 133 appears an example collaborative session as viewed from a given client device, and which can be similarly displayed on each connected client device. This example collaborative session includes a video broadcast 170. Video broadcast 170 can be any audio or video content broadcast from an application server, or contributed by a connected client device. For example, video broadcast 170 can be a television broadcast such as a televised news program, which can provide topics for collaborative discussion. This example collaborative session also includes comments window 172, which can function as a chat messaging window for displaying comments and remarks from various connected clients. Each text representation, within comments window 172, can be contributed by a different connected client or participant.

Comments window 172 includes comment 173 (displayed as a couple of lines of comments), which was contributed by a participating client. Comment 173 can appear without identification of the contributing participant such as a participant's name. In this example illustration, a viewing client moves cursor 175 to select comment 173. In response to such a selection, the client application can send a request to the session manager to retrieve presence information associated with the client that contributed comment 173. The session manager transmits corresponding presence information, and then the client application displays corresponding presence information in window 177. Presence information within window 177 can include any metadata such as an image, name, role, connection status, interests, and so forth. Thus, while perhaps many thousands of clients are connected to this collaborative service session and viewing broadcast content, connected clients can fetch presence information associated with participants actually contributing messages, while presence information associated with the remaining clients is not automatically displayed within the client application.

While knowing names and identities of each client connected to a collaboration session can be useful, to many users it is more important to know who is currently or actively participating within the collaboration session. Thus, knowing the identity of non-contributing clients becomes a relatively lower priority.

FIG. 1 also shows a general overview of the session manager and how the session manager can be tied to an example physical apparatus, such as a computer and related components. After this description of FIG. 1 appears a more detailed description of processes and methods executed by the session manager itself. This subsequent description will explain the flow charts and to describe example embodiments.

In FIG. 1, computer system 110 is shown connected to display monitor 130 for displaying a graphical user interface 133 for a user 106 to use a session manager 140 for playback operations from data streams, using input devices 116. Repository 181 can be used for recording submitted data and/or data structures both before and after processing. Input devices 116 can include one or more devices such as a keyboard, computer mouse, etc.

Note that the following discussion provides a basic embodiment indicating how to carry out functionality associated with the session manager 140 as discussed above and below. It should be noted, however, that the actual configuration for carrying out the session manager 140 can vary depending on a respective application. For example, as previously discussed, computer system 110 can include one or multiple computers that carry out the processing as described herein.

In different embodiments, computer system 110 may be any of various types of devices, including, but not limited to, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

As shown, computer system 110 of the present example includes an interconnect 111 that couples a memory system 112, a processor 113, I/O interface 114, and a communications interface 115.

I/O interface 114 provides connectivity to peripheral devices such as input devices 116 including a computer mouse, a keyboard, a selection tool to move a cursor, display screen, etc.

Communications interface 115 enables the session manager 140 of computer system 110 to communicate over a network and, if necessary, retrieve any data required to create views, process content, communicate with a user, etc. according to embodiments herein.

As shown, memory system 112 is encoded with session manager 140-1 that supports functionality as discussed above and as discussed further below. Session manager 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the session manager 140-1. Execution of the session manager 140-1 produces processing functionality in session manager process 140-2. In other words, the session manager process 140-2 represents one or more portions of the session manager 140 performing within or upon the processor 113 in the computer system 110.

It should be noted that, in addition to the session manager process 140-2 that carries out method operations as discussed herein, other embodiments herein include the session manager 140-1 itself (i.e., the un-executed or non-performing logic instructions and/or data). The session manager 140-1 may be stored on a tangible computer readable storage medium including computer readable storage media such as floppy disk, hard disk, optical medium, etc. According to other embodiments, the session manager 140-1 can also be stored in a memory type system such as in firmware, read only memory (ROM), or, as in this example, as executable code within the memory system 1012.

In addition to these embodiments, it should also be noted that other embodiments herein include the execution of the session manager 140-1 in processor 113 as the session manager process 140-2. Thus, those skilled in the art will understand that the computer system 110 can include other processes and/or software and hardware components, such as an operating system that controls allocation and use of hardware resources, or multiple processors.

Functionality supported by computer system 110 and, more particularly, functionality associated with session manager 140 will now be discussed via flowcharts and diagrams in FIG. 2 through FIG. 4. For purposes of the following discussion, the session manager 140 or other appropriate entity performs steps in the flowcharts.

Figure 2:
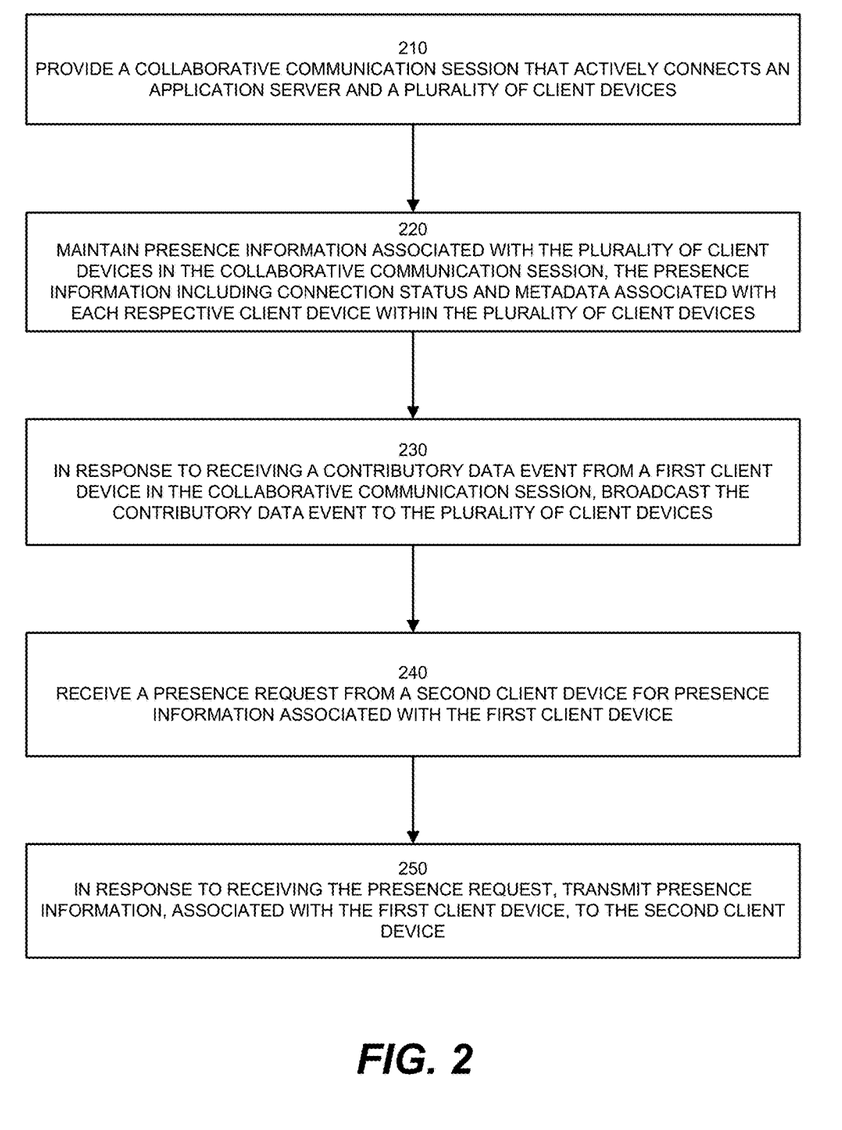
FIG. 2 is a flowchart illustrating an example of a process supporting a session manager operating within a collaborative service environment according to embodiments herein.

Now describing embodiments more specifically, FIG. 2 is a flow chart illustrating embodiments disclosed herein.

In step 210, session manager 140 provides a collaborative communication session that actively connects an application server and a plurality of client devices. Providing can include serving the collaborative communication session such as with a computer server. The collaborative communication session actively connects an application server and a plurality of client devices for a duration of the collaborative communication session. Session manager 140 can operate at the server and/or client level. The collaborative communication session can be any networked environment for interactively connecting client devices. For example, such a collaborative communication session could be a chat room, virtual room, web conference session, video broadcast, etc. By actively interconnecting the clients, messages can be received from and pushed to the client devices. Such collaborative communication sessions can be schedule to begin at a certain time, or be open for a predetermined time, or can remain open as long a specific number of clients remain connected. Session manager 140 functions such that data events, received from a given client device connected to the collaborative communication session, are broadcast via the application server to each client device within the plurality of client devices. A data event or data transaction can include various input and actions that a given client device can perform, such as drawing commands, or submission of comments, voting on a poll, and so forth. The collaborative communication session is enabled to selectively publish presence information associated with each connected client device. The session manager 140 can transmit or withhold presence information based on various inputs or configurations. The session manager 140 can publish this presence information to the plurality of client devices for each client device to maintain a list of connected participants. Each client device can optionally display a roster or list of client devices and metadata associated with participants on the list. A given client application can display all or a portion of connected clients.

In step 220, session manager 140 maintains presence information associated with the plurality of client devices in the collaborative communication session. Session manager 140 can receive presence information from each client device joined in the collaborative communication session. This presence information includes connection status and metadata associated with each respective client device. Presence information that is associated with a respective client device is in turn associated with a participant or user of that respective client device. Part of providing a collaborative environment that enables interactive communication is to establish identities and connections with client devices for sending and receiving data during a connection period.

In step 230 in response to receiving a contributory data event from a first client device in the collaborative communication session, session manager 140 broadcasts the contributory data event to the plurality of client devices.

In step 240, session manager 140 receives a presence request from a second client device for presence information associated with the first client device. This second client device can be any given client device actively connected to the communication session.

In step 250, in response to receiving the presence request, session manager 140 transmits presence information, associated with the first client device, to the second client device. Individual requests can be initiated manually at client applications. For example, a given connected client device can identify a data event or communication, and request associated presence information, such as by clicking on a displayed data event, or otherwise initiating a query window to retrieve the presence information. Alternatively, individual requests can be automatically generated. For example, a given client application can be configured to retrieve presence information associated with each contributed data event, or associated with specific types of data events, or based on any other filter criteria.

Figure 3:
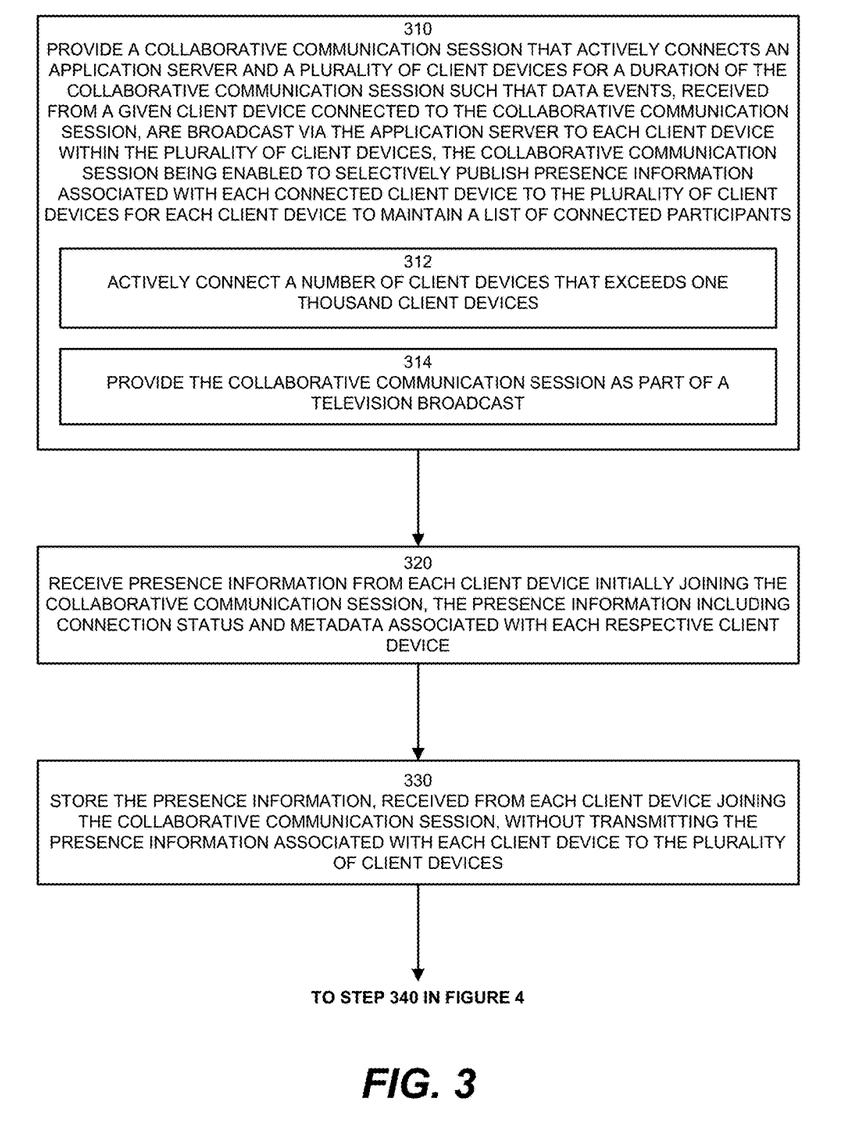
FIGS. 3-4 are a flowchart illustrating an example of a process supporting a session manager operating within a collaborative service environment according to embodiments herein.
Figure 4:
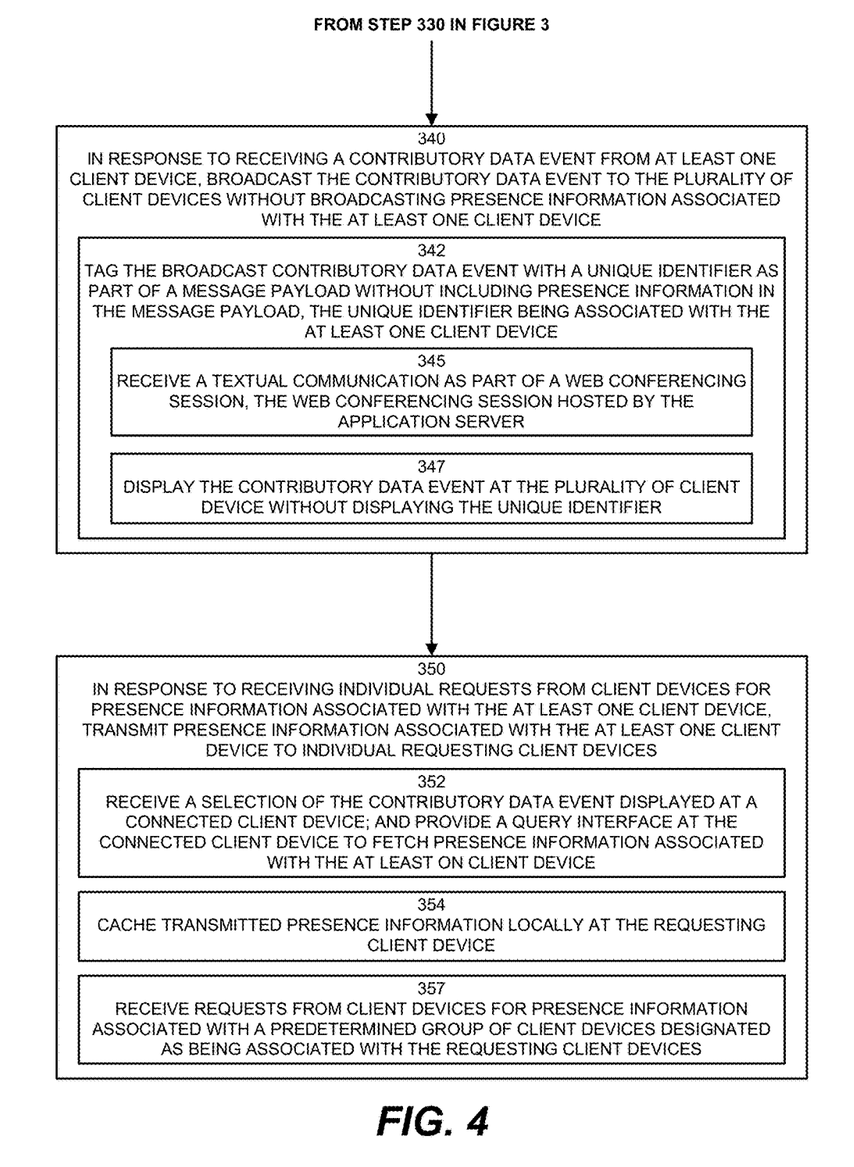

Another example embodiment of the session manager process appears in the flow chart of FIGS. 3-4. This embodiment expands on embodiments from FIG. 2 by providing additional alternative features.

In step 310, session manager 140 provides a collaborative communication session that actively connects an application server and a plurality of client devices for a duration of the collaborative communication session. Session manager 140 functions such that data events, received from a given client device connected to the collaborative communication session, are broadcast via the application server to each client device within the plurality of client devices. The collaborative communication session is enabled to selectively publish presence information associated with each connected client device. The session manager 140 can publish this presence information to the plurality of client devices for each client device to maintain a list of connected participants.

In step 312, session manager 140 actively connects a number of client devices that exceeds one thousand client devices. While session manager 140 can function with just a few connected client devices, session manager 140 can also function with many thousands of connected devices.

Conventional web conferencing applications, or chat applications can crash when trying to maintain a current roster of hundreds or thousands of connected clients.

In step 314, session manager 140 provides the collaborative communication session as part of a television broadcast. Television, or other video content, is commonly streamed to computing devices. Moreover, many television devices include networking functionality. Thus, in one embodiment, a given video broadcast, such as a news program, can be configured to be broadcast as part of a virtual room where thousands of client devices can be actively connected for sending and receiving communications related to the video broadcast.

In step 320, session manager 140 receives presence information from each client device initially joining the collaborative communication session. This presence information includes connection status and metadata associated with each respective client device.

In step 330, session manager 140 stores the presence information, received from each client device joining the collaborative communication session, without transmitting the presence information associated with each client device to the plurality of client devices. Thus, in lieu of updating each client device to the status and presence of other connected client devices, session manager 140 stores this information centrally without distributing to connected client devices.

In step 340, in response to receiving a contributory data event from at least one client device, session manager 140 broadcasts the contributory data event to the plurality of client devices without broadcasting presence information associated with the at least one client device. For example, if a given client submits a chat message or similar communication, this message is transmitted to each client device but without identifying a name, role, or other information associated with the client device.

In step 342, session manager 140 tags the broadcast contributory data event with a unique identifier as part of a message payload without including presence information in the message payload. This unique identifier is associated with the at least one client device. The identifier can be any character sequence and can be generated automatically by the session manager 140. The session manager 140 can then maintain a table to map client IDs with corresponding presence information.

In step 345, session manager 140 receives a textual communication as part of a web conferencing session, with this web conferencing session being hosted by the application server. Thus, in one embodiment, the collaborative communication session can be a web conference event.

In step 347, session manager 140 displays the contributory data event at the plurality of client devices without displaying the unique identifier. For example, with embodiments where the unique identifier is completely arbitrary, this identifier does not need to be displayed on client devices.

In step 350, in response to receiving individual requests from client devices for presence information associated with the at least one client device, session manager 140 transmits presence information associated with the at least one client device to individual requesting client devices.

In step 352, session manager 140 receives a selection of the contributory data event displayed at a connected client device. For example, a user moves a cursor or pointing device to a line of chat text, or drawing symbol. The session manager 140 then provides a query interface at the connected client device to fetch presence information associated with the at least on client device. The query interface can be displayed to the client device or operate seamlessly in the background.

In step 354, session manager 140 caches transmitted presence information locally at the requesting client device. After receiving presence information, this information can be stored at the client device. Subsequent requests for presence information already fetched can then be locally retrieved, thus saving computational resources.

In step 357, session manager 140 receives requests from client devices for presence information associated with a predetermined group of client devices designated as being associated with the requesting client devices. Some client devices may be part of a specific organization within a larger group of connected devices. For example, a marketing department maybe a part of a company's web conference session, and members of this marketing department can be grouped for automatic retrieval of presence information, without contributing data events. Alternatively, session manager 140 can provide the predetermined group as a buddy list, or group of known acquaintances.

Such an embodiment using buddy lists can include clients having a list of participants affiliated with that particular client so that session manager 140 can transmit private messages to each of the participants on a given buddy list to indicate which participants on the list are logged in to the collaborative service session. Each of the clients on the buddy list can then receive a publisher ID and then manually or automatically collect or download presence information from the collaborative service.

In another embodiment, session manager 140 provides a software development platform for creating an application for a collaborative communication session, with the collaborative communication session enabled to actively connect an application server and a plurality of client devices for a duration of the collaborative communication session such that data events. Such a software development platform can provide an interface, such as a graphical user interface, to the software development platform for receiving input to enable the application to provide selective publishing of presence information associated with each connected client device to the plurality of client devices for each client device to maintain a list of connected participants. Thus, techniques disclosed herein can provide both a collaboration service itself (operating in a Internet-based environment), and an client development kit. The client development kit can include a set of components, a set of code, and a framework for building real-time collaborative applications.

This client development kit enables administrators to toggle a control, for a given virtual room or collaboration event, to designate a particular room as high-capacity, and then activate anonymous, selective, on-demand, or lazy presence loading for this particular room. In other words, the administrator sends a message or command to the collaboration service instructing not to rebroadcast presence information unless a client asks for that presence information. When the session manager 140 receives a presence ping, then the session manager 140 stores the ping and does not send (automatically send) the presence information to connected clients. When a client begins participating, such as submitting a chat message within a discussion room or casting a vote, or leaving a sticky note, turning on a camera, or taking some other action, such participation will cause the contributing user to be noticed by the room at large. Since messages broadcast to connected devices contain an accompanying publisher ID, client applications are able to fetch presence information associated with a contributing user.

Session manager 140 does not need to use a name with a chat message itself, but can simply use an identifier. Once client applications have received the identifier, a given user can use that identifier to fetch additional information, such as a contributor's name, e-mail, role, phone number, avatar, profile data, or any other public or private information.

Session manager 140 can be used to build collaborative applications that make customizable information, associated with participants, available to clients. Within a relatively large virtual room with thousands of connected participants, presence information can be deemed unimportant until user activity is present. After activity from a contributing client is displayed on client applications, then associated presence information can be deemed useful. For example, in a given crowd of people, most people are relatively anonymous, but when a person within the crowd stands or speaks, other crowd members typically want to know an identity of the speaker. To access the presence information then, for example, the collaboration session manager 140 could identify a mouse-over on a particular chat message and then provide an interface for retrieving additional information or displaying additional information about a contributor of that particular chat message. The session manager 140 provides an interface for a requesting client to contact the contributing client privately, or to store additional information or subsequent contact information.

This presence information can be displayed automatically or manually. For example a particular participant can configure a client application to display presence information for each user or client who contributes to the virtual room, or the participant can manually click on only specific contributing clients to the virtual room. Session manager 140 can then display presence information within a separate window or display area, or presence information could be superimposed or otherwise stored. At the end of a particular collaborative service session, a given client user could access a list of all participatory clients along with associated presence information.

Embodiments of a collaboration service can apply to more than web conferencing and webinar events. Session manager 140 can operate with large-scale broadcast participation. For example, in conjunction with a television broadcast of a particular entertainment program, the collaboration service can provide a forum for viewers to login and discuss the program or take surveys, or take polls, or submit video or audio commentary. In this example embodiment, there could be hundreds of thousands of users participating in a virtual room or other participatory event, with all users being actively connected. Additionally, the collaboration service can optionally identify a total number of users connected to a particular collaborative service session. Data on the total number of users could be transmitted only upon request for clients who are interested. Yet other embodiments can build a collaborative communication session used for auctions as an effective way for collaborative users to contact a seller and to interactively communicate with other active bidders.

Those skilled in the art will understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method comprising:
   providing a collaborative web conferencing session that connects an application server and a plurality of client devices;
   maintaining presence information associated with the plurality of client devices in the collaborative web conferencing session, the presence information including connection status and metadata associated with each respective client device within the plurality of client devices, wherein the presence information is provided as a list of connected participants in a virtual room of the collaborative web conferencing session;
   in response to determining that a number of connected participants in the virtual room exceeds a threshold:
   designating the virtual room as high capacity;
   preventing automatic re-broadcast of the presence information by the collaborative web conferencing session; and
   in response to receiving a contributory data event from a first client device in the collaborative web conferencing session, broadcasting the contributory data event to the plurality of client devices and updating the list to indicate current presence information for the first client device, wherein receiving the contributory data event includes receiving a communication from the first client device indicating that the first client device is participating in the web conferencing session;
   after receiving the contributory data event from the first client device, receiving a presence request from a second client device for presence information associated with the first client device; and
   in response to receiving the presence request, transmitting presence information associated with the first client device to the second client device, the presence information including a connection status of the first client device and metadata identifying the first client device.

2. The computer-implemented method of claim 1, wherein broadcasting the contributory data event includes tagging the broadcast contributory data event with a unique identifier as part of a message payload, the unique identifier being associated with the first client device.

3. The computer-implemented method of claim 2, wherein receiving the contributory data event from the first client device includes receiving a textual communication as part of the web conferencing session, the web conferencing session hosted by the application server.

4. The computer-implemented method of claim 2, further comprising displaying the contributory data event at the plurality of client devices while concealing the unique identifier from display.

5. The computer-implemented method of claim 1, wherein receiving the presence request includes receiving a selection of the contributory data event displayed at the second client device, the method further comprising, in response to receiving the selection, providing a query interface at the second client device to fetch presence information associated with the first client device.

6. The computer-implemented method of claim 5, wherein transmitting presence information associated with the first client device to the second client device includes caching transmitted presence information locally at the second client device.

7. The computer-implemented method of claim 1, further comprising:
   receiving a request from the second client device for presence information associated with a predetermined group of client devices designated as being associated with the second client device; and in response to receiving the request, transmitting presence information associated with the group of client devices to the second client device, the presence information including a connection status of each respective client device within the group of client devices and metadata identifying each respective client device within the group of client devices.

8. The computer-implemented method of claim 1, wherein providing the collaborative web conferencing session that connects the application server and the plurality of client devices includes connecting a number of client devices that exceeds one thousand client devices.

9. The computer-implemented method of claim 8, wherein providing the collaborative web conferencing session that connects the application server and the plurality of client devices includes providing the collaborative web conferencing session in association with a television broadcast.

10. A computer system comprising:
a processor;
a memory coupled to the processor, the memory storing instructions that when executed by the processor cause the system to perform the operations of:
providing a collaborative web conferencing session that actively connects an application server and a plurality of client devices;
maintaining presence information associated with the plurality of client devices in the collaborative web conferencing session, the presence information including connection status and metadata associated with each respective client device within the plurality of client devices, wherein the presence information is provided as a list of connected participants in virtual room of the collaborative web conferencing session;
in response to determining that a number of connected participants in the virtual room exceeds a threshold:
designating the virtual room as high capacity;
preventing automatic re-broadcast of the presence information by the collaborative web conferencing session; and
in response to receiving a contributory data event from a first client device in the collaborative web conferencing session, broadcasting the contributory data event to the plurality of client devices and updating the list to indicate current presence information for the first client device, wherein receiving the contributory data event includes receiving a communication from the first client device indicating that the first client device is participating in the web conferencing session;
after receiving the contributory data event from the first client device, receiving a presence request from a second client device for presence information associated with the first client device; and
in response to receiving the presence request, transmitting presence information associated with the first client device to the second client device, the presence information including a connection status of the first client device and metadata identifying the first client device.

11. The computer system of claim 10, wherein broadcasting the contributory data event includes tagging the broadcast contributory data event with a unique identifier as part of a message payload, the unique identifier being associated with the first client device.

12. The computer system of claim 11, wherein receiving the contributory data event from the first client device includes receiving a textual communication as part of the web conferencing session, the web conferencing session hosted by the application server.

13. The computer system of claim 11, further comprising displaying the contributory data event at the plurality of client devices while concealing the unique identifier from display.

14. The computer system of claim 10, wherein receiving the presence request includes receiving a selection of the contributory data event displayed at the second client device, the method further comprising, in response to receiving the selection, providing a query interface at the second client device to fetch presence information associated with the first client device.

15. The computer system of claim 14, wherein transmitting presence information associated with the first client device to the second client device includes caching transmitted presence information locally at the second client device.

16. The computer system of claim 10, further comprising:
receiving a request from the second client device for presence information associated with a predetermined group of client devices designated as being associated with the second client device; and
in response to receiving the request, transmitting presence information associated with the group of client devices to the second client device, the presence information including a connection status of each respective client device within the group of client devices and metadata identifying each respective client device within the group of client devices.

17. The computer system of claim 10, wherein providing the collaborative web conferencing session that actively connects the application server and the plurality of client devices includes actively connecting a number of client devices that exceeds one thousand client devices.

18. The computer system of claim 17, wherein providing the collaborative web conferencing session that actively connects the application server and the plurality of client devices includes providing the collaborative web conferencing session in association with a television broadcast.

19. A computer-implemented method comprising:
providing a software development platform for creating an application for providing a collaborative web conferencing session, the collaborative web conferencing session enabled to actively connect an application server and a plurality of client devices for a duration of the collaborative web conferencing session such that data events, received from a first client device connected to the collaborative web conferencing session, are broadcast via the application server to the plurality of client devices in the collaborative web conferencing session;
providing an interface to the software development platform for receiving input to enable the application to provide selective publishing of presence information associated with the plurality of client devices for each client device to maintain a list of connected participants; and
in response to receiving input to enable the application to provide selective publishing of presence information, configuring the application to perform operations comprising:
maintaining presence information from each respective client device connected to the collaborative web conferencing session, the presence information including connection status and metadata associated with each respective client device, wherein the presence information is provided with the list of connected participants in a virtual room of the collaborative web conferencing session;

in response to determining that a number of connected participants in the virtual room exceeds a threshold:

designating the virtual room as high capacity;

preventing automatic re-broadcast of the presence information by the collaborative web conferencing session; and in response to receiving a contributory data event from a first client device in the collaborative web conferencing session, broadcasting the contributory data event to the plurality of client devices and updating the list to indicate current presence information for the first client device, wherein receiving the contributory data event includes receiving a communication from the first client device indicating that the first client device is participating in the web conferencing session;

after receiving the contributory data event from the first client device, receiving a presence request from a second client device for presence information associated with the first client device; and in response to receiving the presence request, transmitting presence information associated with the first client device to the second client device, the presence information including a connection status of the first client device and metadata identifying the first client device.

20. The computer-implemented method of claim 19, wherein providing the software development platform for creating the application includes the collaborative web conferencing session configured to actively connect and selectively provide presence information for more than one thousand client devices.

* * * * *